United States Patent
Sheriff

(10) Patent No.: US 11,222,333 B2
(45) Date of Patent: Jan. 11, 2022

(54) IN-FLIGHT FIAT PAYMENT AUTHORIZATION AND CAPTURE SETTLEMENT

(71) Applicant: Panasonic Avionics Corporation, Lake Forest, CA (US)

(72) Inventor: FaizalSheriff Kalifullah Sheriff, Irvine, CA (US)

(73) Assignee: PANASONIC AVIONICS CORPORATION, Lake Forest, CA (US)

( * ) Notice: Subject to any disclaimer, the term of this patent is extended or adjusted under 35 U.S.C. 154(b) by 18 days.

(21) Appl. No.: 16/428,844

(22) Filed: May 31, 2019

(65) Prior Publication Data

US 2020/0380508 A1    Dec. 3, 2020

(51) Int. Cl.
*G06Q 20/40* (2012.01)
*G06Q 20/10* (2012.01)

(52) U.S. Cl.
CPC ............. *G06Q 20/40* (2013.01); *G06Q 20/10* (2013.01)

(58) Field of Classification Search
None
See application file for complete search history.

(56) References Cited

U.S. PATENT DOCUMENTS

| | | |
|---|---|---|
| 2015/0046337 A1 | 2/2015 | Hu et al. |
| 2017/0053248 A1* | 2/2017 | Wakefield .......... G06Q 10/1095 |
| 2017/0053249 A1* | 2/2017 | Tunnell ................ G06Q 20/382 |
| 2018/0121911 A1 | 5/2018 | Hallam et al. |
| 2018/0293555 A1* | 10/2018 | Handoko ............... G06Q 20/36 |
| 2019/0104196 A1* | 4/2019 | Li ........................ H04L 41/5054 |
| 2020/0193441 A1* | 6/2020 | Mokhasi ................ G06Q 20/32 |

FOREIGN PATENT DOCUMENTS

WO    2018125989 A2    7/2018

OTHER PUBLICATIONS

Siebold et al., Consensus Immutable agreement for the internet of value, 2016, entire document pertinent, retrieved from https://assets.kpmg/content/dam/kpmg/cn/pdf/en/2016/09/blockchain-consensus.pdf (Year: 2016).*

(Continued)

*Primary Examiner* — Gregory S Cunningham, II
(74) *Attorney, Agent, or Firm* — Perkins Coie LLP

(57) ABSTRACT

A system for offline transaction processing has a payment terminal capturing payment credentials and a payment amount as a transaction data set. A first blockchain server has a first copy of a transaction ledger to which the transaction data set is committed as a ledger entry in response to a validation against one or more rules stored in an offline database. A second blockchain server has a second copy of the transaction ledger, and is in sporadic communication with the first blockchain server over a temporary data transfer link. The transaction data set previously committed to the first copy of the transaction ledger is propagated to the second copy of the transaction ledger over the temporary data transfer link. A payment gateway retrieves the transaction data set in the second copy of the transaction ledger and translates the same to a settlement request transmitted to the remote payment processor.

11 Claims, 5 Drawing Sheets

(56) References Cited

OTHER PUBLICATIONS

Dmitrienko et al., "On Offline Payments with Bitcoin (Poster Abstract)," International Conference on Financial Cryptography and Data Security, Oct. 8, 2014, pp. 159-160.
Dragomirescu, "Project OtherCoin," whitepaper, Mar. 8, 2015, 5pgs.
Dmitrienko et al., "Secure Wallet-Assisted Offline Bitcoin Payments with Double-Spender Revocation," AsiaCCS '17, Abu Dhabi, UAE, Apr. 4-6, 2017, 12pgs.
Miller et al., "Sprites: Payment Channels that Go Faster than Lightning," arXiv:1702.05812, Feb. 19, 2017, 24 pgs.
Hu et al., "A Delay-Tolerant Payment Scheme Based on the Ethereum Blockchain," arXiv:1801.1029, Jan. 31, 2018, 10pgs.
Lind et al., "Teechain: A Secure Asynchronous Blockchain Payment Network," arXiv:1707.054542, Dec. 6, 2018, 28pgs.
Lind et al., "Teechain: Reducing Storage Costs on the Blockchain with Offline Payment Channels," ACT International Systems and Storage Conference (SYSTOR 2018), Jun. 4-6, 2018, p. 125.
Mena et al., "Blockchain-Based Whitelisting for Consumer IoT Devices and Home Networks," Proceedings of the 19th Annual SIG Conference on Information Technology Education (SIGITE '18), pp. 7-12, 2018.

\* cited by examiner

IN-FLIGHT FIAT PAYMENT AUTHORIZATION AND CAPTURE SETTLEMENT

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present disclosure relates generally to vehicle entertainment systems and payment processing for purchases thereon, and more particularly to in-flight fiat payment authorization and capture settlement using blockchain in an offline mode.

2. Related Art

Among the many advancements in aircraft technology, improvements in passenger comfort and convenience have received much attention. Air travel typically involves journeys over extended distances that at the very least take several hours to complete, so airlines provide onboard in-flight entertainment and communications (IFEC) systems that offer a wide variety of multimedia content for passenger enjoyment. Recently released movies are a popular viewing choice, as are television shows such as news programs, situation and stand-up comedies, documentaries, and so on. Useful information about the destination such as airport disembarking procedures, immigration and custom procedures and the like are also frequently presented. Audio-only programming is also available, typically comprised of playlists of songs fitting into a common theme or genre. Likewise, video-only content such as flight progress mapping, flight status displays, and so forth are available. Many in-flight entertainment systems also include video games that may be played by the passenger.

The specific installation may vary depending on service class, though in general, each passenger seat is equipped with a display device, an audio output modality, an input modality, and a terminal unit. The terminal unit may generate video and audio signals, receive inputs from the input modality, and execute pre-programmed instructions in response thereto. The display device is typically an LCD screen that is installed on the seatback of the row in front of the passenger, though in some cases it may be mounted to a bulkhead or retractable arm, or the like, that is in turn mounted to the passenger's seat. Furthermore, the audio output modality is a headphone jack, to which a headphone, either supplied by the airline or by the passenger, may be connected. Inputs to the terminal unit may be provided via a separate multi-function remote controller or by via a combination touch display. Although the terminal unit and display device were separate components in earlier IFEC implementations, more recently, these components and more may be integrated into a single smart monitor.

The multimedia content is encoded and stored as digital data on an on-board IFEC head-end server. The smart monitor and the head-end server thus incorporate networking modalities to establish data communications between each other. Once a particular selection of multimedia content is selected for playback by the passenger, the smart monitor retrieves the same, and a video decoder and an audio decoder function to generate the video and audio signals to the display device and the audio output modality, respectively, for presentation to the passenger.

For the most part, the entirety of the multimedia content selection is made available to the passenger during the flight that are paid for as part of the airfare. Increasingly, however, airlines are offering premium content that may incur additional fees before a digital rights management (DRM) unlocks the content for playback. Additionally, the onboard use of personal electronic devices (PEDs) such as smartphones, tablets, and portable computers have increased the demand for satellite Internet connectivity, which likewise incur additional fees. Beyond access to IFEC-related services, airlines are also offering a la carte products and services not included as part of the base airfare such as meals and alcoholic beverages and charged separately upon purchase during flight. Payments may be made via the smart monitor, crew hand-held devices, or aircraft-installed stationary devices. In general, IFEC-based payment systems include a finance component that handles payments, and a communications component.

The finance component may be further separated into and air-side payment component, also referred to as an edge component, as well as a ground-side payment component, a Payment Card Industry Data Security Standard (PCI-DSS)-compliance component, and a payment processor that contracts with the airline to handle the authorization and settlement services with financial institutions.

The communications component likewise includes an air-side part and a ground-side part. Depending on the aircraft type and the availability of connectivity services, payment authorization can take place during the flight, also referred to as "live auth" or "online mode." It is also possible for the payment authorizations to be completed while completely offline, referred to as "deferred auth" or "offline mode." On the ground-side part, a custom protocol that supports file fragmentation and store-and-forward functionalities is utilized for the offloading of data from the aircraft to a ground-based computer system.

While in the online mode, authorization of a transaction takes place in the air, while the capture transaction, or when the authorized money is transferred from a customer account to a merchant account, takes place on the ground. Specifically, the capture transactions are recorded in a flat file and directly transmitted to the ground-side part/ground-side payment component.

In the offline mode, both the authorization and capture transactions take place on the ground at a time subsequent to when the goods or services are delivered during the flight. A basic authorization of the transaction takes place offline using custom offline authorization rules, and the capture transactions are similarly recorded in a flat file. The flat file is transferred to the ground-side part/ground-side payment component when the aircraft lands and the flight is concluded. The payment data is transferred over a cellular modem.

Existing data transfer modalities have proven deficient for several reasons. In particular, the transfer of the financial data files is unreliable, leading to the periodic delay in this data being provided to the airline payment processor. In some cases, these data files may get lost without any further processing. Additionally, duplicate weight-on-wheels events and other triggering mechanisms can cause duplicate transfers of the financial data files. The lack of a standard file exchange format between IFEC providers and the now numerous payment processors have delayed settlement, which in turn have resulted in increased penalty charges being imposed by credit card networks and payment processors.

Accordingly, there is a need in the art for improving reliability and consistency in processing in-flight payment authorization and capture settlement. There is also a need for blockchain-based fiat payment authorization and capture settlement that functions in an offline mode.

BRIEF SUMMARY

The present disclosure contemplates the use of distributed ledger/blockchain servers operated in a closed-loop configuration to validate and record successful and unsuccessful payment transactions on board a vehicle or other location in which a continuous connection to a payment process is unavailable. These payment transactions are envisioned to be transferred seamlessly over conventional data transport modalities such as the Secure HyperText Transfer Protocol (HTTPS) to remote servers with distributed ledger technology operating in an observer mode. The tamper protection capabilities of a blockchain distributed ledger, along with its immutability, seamless synchronization, tamper detection, deduplication detection, and data protection are understood to improve the reliability of the payment processing system without a continuous data transfer link.

An embodiment of the present disclosure may be a system for offline transaction processing. The system may include a payment terminal that captures payment credentials and a fiat currency payment amount associated therewith as a transaction data set. There may also be an offline rule database including one or more transaction validation rules. The system may have a first blockchain server with a first copy of a transaction ledger. The first blockchain server may be in communication with the payment terminal to accept the transaction data set. Additionally, the first blockchain server may be operating in a validator mode. The transaction data set may be committed to the first copy of the transaction ledger as a ledger entry in response to a validation of the captured transaction data set against the one or more transaction validation rules. The system may also include a second blockchain server with a second copy of the transaction ledger. The second blockchain server may be operating in an observer mode and in sporadic communication with the first blockchain server over a temporary data transfer link. The captured transaction data set previously committed to the first copy of the transaction ledger on the first blockchain server may be propagated to the second copy of the transaction ledger on the second blockchain server over the temporary data transfer link. The system may further include a payment gateway in communication with the second blockchain server and a remote payment processor. The payment gateway may retrieve the transaction data set in the second copy of the transaction ledger on the second blockchain server for translation to a settlement request transmitted to the remote payment processor. The payment gateway may also receive a settlement response from the remote payment processor.

According to another embodiment of the present disclosure, there may be a payment authorization and capture transaction processing system onboard an aircraft. The system may include a payment terminal that captures payment credentials and a payment amount associated therewith as a transaction dataset. There may also be a processing rules database that includes one or more transaction validation rules. Additionally, the system may have an onboard blockchain server with a local transaction ledger. The onboard blockchain server may be in communication with the payment terminal to accept the captured transaction data set, and further may be operating in a validator mode. The captured transaction data set may be committed to the local transaction ledger as a ledger entry in response to a validation of the captured transaction data set against the one or more transaction validation rules. The ledger entries may be propagated to a remote ground-based blockchain server over a temporary data transfer link established between the onboard blockchain server and the remote ground-based blockchain server.

Still another embodiment may be a ground-based payment authorization and capture settlement transactions processing system that cooperates with a counterpart aircraft-based transaction processing system. The system may include a first ground-based blockchain server operating in an observer mode, and may have a copy of a transaction ledger. The first ground-based blockchain server may be receptive to one or more ledger entries of captured transaction data sets. Each of these ledger entries may include payment credentials and a payment amount. The one or more ledger entries may be committed into a remote copy of the transaction ledger maintained on the counterpart aircraft-based transaction processing system, and further, transmitted to the first ground-based blockchain server over a temporary data transfer link. There may also be a payment gateway that is in communication with the first ground-based blockchain server and a remote payment processor. The payment gateway may retrieve the transaction data set in the copy of the transaction ledger on the first ground-based blockchain server. This may be for translating the transaction data set to a settlement request transmitted to the remote payment processor. The payment gateway may receive a settlement response from the remote payment processor.

The present disclosure will be best understood accompanying by reference to the following detailed description when read in conjunction with the drawings.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The detailed description set forth below in connection with the appended drawings is intended as a description of the several presently contemplated embodiments directed to the in-flight fiat payment authorization and capture settlement using blockchain in an offline mode. This description is not intended to represent the only form in which the embodiments of the disclosed invention may be developed or utilized. The description sets forth the functions and features in connection with the illustrated embodiments. It is to be understood, however, that the same or equivalent functions may be accomplished by different embodiments that are also intended to be encompassed within the scope of the present disclosure. It is further understood that the use of relational terms such as first and second and the like are used solely to distinguish one from another entity without necessarily requiring or implying any actual such relationship or order between such entities.

Figure 1:
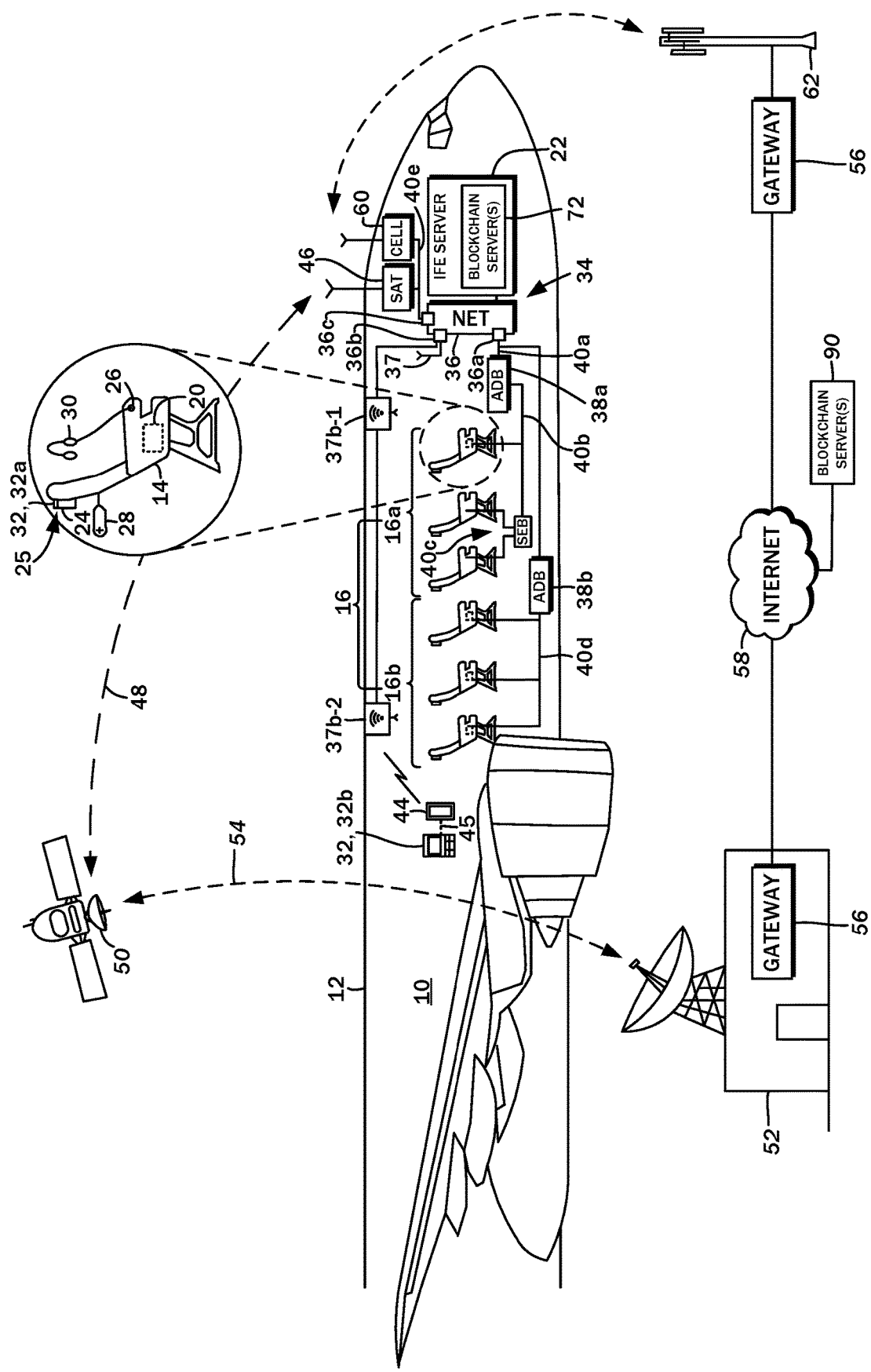
FIG. 1 is a diagram illustrating an exemplary aircraft in which an in-flight entertainment and communications system that may be utilized in one embodiment of a system for offline transaction processing.

FIG. 1 is a simplified diagram of an aircraft 10, generally referred to herein as a vehicle, along with select subsystems and components thereof that may be utilized in the offline payment system of the present disclosure. Within a fuselage 12 of the aircraft 10, there may be seats 14 arranged over multiple rows 16, with each seat 14 accommodating a single passenger. Although the features of the present disclosure will be described in the context of the aircraft 10, this is by way of example only and not of limitation. The presently disclosed embodiments may be applicable to other contexts as appropriate, such as, by way of non-limiting illustrative example, busses, trains, ships, and other types of vehicles.

Installed in the aircraft 10 is an in-flight entertainment and communications (IFEC) system 18, through which various entertainment and connectivity services may be provided to passengers while onboard. When referenced generally, the IFEC system 18 is understood to encompass terminal devices 20 installed for each seat 14, as well as the IFEC server 22 and the other components involved in the delivery of the entertainment and communications functionality. In the illustrated example, this includes a display 24, an audio output 26, and a remote controller or handset 28. For a given row 16 of seats 14, the terminal device 20 and the audio output 26 are disposed on the seat 14 for which it is provided, but the display 24 and the handset 28 may be located on the row 16 in front of the seat 14 to which it is provided. That is, the display 24 and the handset 28 are installed on the seatback of the row in front of the seat. Other display 24 and handset 28 mounting and access configurations such as a retractable arm or the like mounted to an armrest of the seat 14 or by mounting on a bulkhead are also possible.

The display 24 is understood to be a conventional liquid crystal display (LCD) screen or other type with a low profile that is suitable for installation on the seatback. Each passenger can utilize an individual headset 30, supplied by either the airline or by the passenger, which provides a more private listening experience. The audio output 26 may be a headphone jack that is a standard ring/tip/sleeve socket. The headphone jack may be disposed in proximity to the display 24 or on the armrest of the seat 14 as shown. The headphone jack may be an active type with noise canceling and including two or three sockets or a standard audio output without noise canceling. Each display 24 may incorporate the aforementioned terminal device 20 to form a unit referred to in the art as a smart monitor 25.

A common use for the terminal device 20 installed on the aircraft 10 is the playback of various multimedia content. The terminal device 20 may be implemented with a general-purpose data processor that decodes the data files corresponding to the multimedia content and generates video and audio signals for the display 24 and the audio output 26, respectively. The multimedia content data files may be streamed to specific terminal devices 20 upon request. The content may be encrypted, so the digital rights management functionality to enable streaming/playback may be performed by the IFEC server 22. Functionality not pertaining to the delivery of multimedia content, such as relaying imagery from external aircraft cameras, flight path/mapping information, and the like may also be performed by the IFEC server 22.

The passenger can play games being executed on the terminal device 20 and otherwise interact with the multimedia content with the handset 28. Navigating through the vast multimedia content library and selecting ones for viewing and/or listening is also possible with the handset 28, though in some different installations, a touch-screen display may be provided for a more intuitive interaction with the multimedia content library. In either case, the terminal device 20 is loaded with a content selection software application that is executed by the data processor and accepts input from the handset 28 or other input modality and generates a response on the graphical interface presented on the display 24.

Although some airlines may choose to make the entirety of the multimedia content library available to all passengers as part of the fare, other airlines may charge an additional fee for accessing premium content. This purchase can be made via the IFEC system 18 using credit cards, debit cards, and other physical payment modalities. Payment cards may incorporate magnetic stripes with payment credential data including, for example, a primary account number, accountholder name, country code, expiration date, and so on that are encoded thereon and read when the card is swiped in a magnetic strip reader. Alternatively, the card may be embedded with an integrated circuit including a memory on which the payment credential data is stored. Contactless payment cards implemented with different technologies such as RFID (radio frequency identification) or NFC (near field communications) may also be utilized, with the same payment credential data being stored on a memory device that is accessed by a corresponding card reader. The payment credential data need not necessarily be provided as a card, as mobile phones with NFC capabilities may also transmit stored payment credential data upon request.

The handset 28 is one possible location in the aircraft cabin where a reader device, referred to more generally as a payment terminal 32, may be installed. This first embodiment of a payment terminal 32a may also be incorporated into the smart monitor 25, the armrest of the seat 14, or any other location that is readily accessible by each individual passenger. It will further be appreciated that payment transactions need not be limited the purchase of additional multimedia content. Payment for other in-flight purchases such as onboard telephone calls, satellite Internet access, alcoholic drinks, additional snacks, duty-free goods, and so forth may also be made with the payment terminal 32.

Each of the terminal devices 20 for the seats 14 may be connected to the IFEC server 22 as well as any or any other server that is part of the IFEC system 18 over a local area network 34, one segment of which may preferably be Ethernet. The IFEC system 18 thus also includes a data communications module 36, and more specifically, an Ethernet data communications module 36a, e.g., an Ethernet switch or router. In a typical aircraft installation, the data communications module 36 is understood to be a separate line replaceable unit (LRU) and may also be referred to as a network controller (NC). Likewise, the IFEC server 22 and the other servers onboard the aircraft 10 are understood be standalone computer systems with one or more general purpose data processors, memory, secondary storage, and a network interface device for connecting to the local area network 34. The computer systems may have an operating system installed thereon, along with server applications (e.g., web servers, streaming servers, and so forth) providing various in-flight entertainment/communications services in cooperation with the terminal devices 20 connected thereto.

The local area network 34 may be logically separated into tiered segments, with the network controller/data communications module 36 being at the top of the hierarchy or central to all of the segments. The smart monitors 25 may be organized according to sections, rows, or columns of seats 14, and the local area network 34 may be structured accordingly.

There may be a first area distribution box (ADB) 38a, which may also be a line replaceable unit that is directly connected to the network controller/data communications module 36 and establishes a segment of the local area network 34 for a first set of rows 16a. Connected to the first ADB 38a over a downstream network segment 40b may be the smart monitors 25. The speed of the network segment 40b may be slower than the upstream network segment 40a. In some implementations, there may be an additional seat electronic box (SEB) 42 that handles some data processing operations shared amongst multiple smart monitors. The further downstream network segment 40c may, in turn, be shared with the peripheral devices connected to the smart monitor such as the payment terminal, a USB port, and the like.

A second ADB 38b is also directly connected to the network controller/data communications module 36 and is also part of the same network segment 40a. The second ADB 38b may be dedicated for the second set of rows 16b, with individual connections to each of the smart monitors 25 or terminal devices 20 defining a network segment 40d. Although different network segmentation hierarchies are illustrated, for example, one set of seats 14 being connected to an SEB 42, which in turn is connected to the ADB 38a, along with a direct connection between the smart monitor 25 or terminal device 20 to the ADB 38b, a typical aircraft configuration will be consistently structured.

Passengers and cabin crew alike may utilize a portable electronic device (PED) 44 during flight. PEDs 44 are understood to refer to smart phones, tablet computers, laptop computers, and other like devices that include a general-purpose data processor that executes pre-programmed instructions to generate various outputs on a display, with inputs controlling the execution of the instructions. Although these devices are most often brought on board the aircraft 10 by the passengers themselves, carriers may also offer them to the passengers for temporary use.

Conventional PEDs 44 are understood to incorporate a WLAN (WiFi) module, so the data communications module 36 of the IFEC system 18 includes a WLAN access point 37 that is connected over a local wireless network interface 36b. The PED 44, via the onboard WLAN network, may connect to the IFEC system 18 to access various services offered thereon such as content downloading/viewing, shopping, and so forth. Typically, a single WLAN access point 37 is insufficient for providing wireless connectivity throughout the cabin, so additional WLAN access points 37b-1, and 37b-2 may be installed at various locations spaced apart from each other. These additional WLAN access points 37b-1 and 37b-2 may be connected to the network controller/data communications module 36 over an Ethernet link that is part of the aforementioned local area network 34. The local area network interface or data communications module 36 is understood to encompass the hardware components such as the WLAN transceiver, antennas, and related circuitry, the Ethernet router/switch, as well as the software drivers that interface the hardware components to the other software modules of the IFEC system 18.

In addition to the dedicated payment terminal 32a for each seat 14/passenger described above, along the same lines as the PED 44 that may be carried throughout the cabin by crewmembers, some variants of the payment terminal 32b may be portable. In some implementations, the payment terminal 32b may be a standalone device that connects directly to the onboard local area network, though it is possible to be configured as a peripheral device to the PED 44 and connected over a peripheral connection 45. The peripheral connection 45 may be a USB link, a Bluetooth wireless link, or any other suitable short-range data transfer modality. Regardless of the connection modality, the payment terminal 32b captures payment credentials and securely transmits the same to a remote destination. Such portable payment terminals 32b may be carried by the cabin crew to process payments for face-to-face transactions with passengers/customers. For example, the purchase of a duty-free good from an inventory being managed by the crewmember where physical possession is transferred from the crewmember to the passenger at the time payment is rendered may be more efficiently settled with the crewmember selecting the purchased item, charging the customer the purchase price for the item, updating the onboard inventory list, and directly passing the item to the customer without communicating commands to the seatback-installed payment terminal 32a.

The IFEC system 18, including each of its constituent components, as well as the other avionics systems and the PEDs 44 onboard the aircraft 10 may communicate with ground-based network nodes via a variety of communications modalities. The network controller/data communications module 36 thus includes a remote module 36c that is connected to, for example, a satellite module 46. The satellite module 46 establishes a data uplink 48 to a communications satellite 50. The data uplink 48 may be Ku-band microwave transmissions. However, any suitable communications satellite 50, such as Inmarsat or Iridium may also be utilized. The data transmitted to the communications satellite 50 is relayed to a satellite communications ground station 52. A data downlink 54 is established between the communications satellite 50 and the satellite communications ground station 52. A network gateway 56 at the satellite communications ground station 52 may then routes the transmission to the Internet 58 or other network. Due to the high costs associated with the communications satellite 50, carriers may limit data traffic to and from the satellite module 46 with a firewall or network access controller.

Alternatively, or additionally, the IFEC system 18 may incorporate a cellular modem 60 for remote connectivity, which similarly establishes a communications link via terrestrial cellular sites 62. This remote connectivity modality is understood to be primarily utilized while the aircraft 10 is on the ground and utilizes a cellular communications provider that offers a network gateway 56 routing data traffic from the cellular modem 60 to the Internet 58 or other wide area network. The cellular modem 60 may serve as a backup to the extent a local airport-based WiFi network is unavailable.

The satellite module 46 and the cellular modem 60 may be on still a different part of the local area network 34, e.g., a fifth network segment 40e. As indicated above, to limit incoming as well as outgoing traffic, this network segment 50e may incorporate a network access controller to paying users, crew members, or other subgroups of those accessing the local area network 34 onboard the aircraft 10.

The foregoing arrangement of the IFEC system 18, along with its constituent components, have been presented by way of example only and not of limitation. Other aircraft 10 may have any number of different configurations, and may incorporated components that were not mentioned above, or functions may be handled by a different subpart or component than that to which above description attributes. Along these lines, features described above may be omitted from such different configurations.

Various embodiments of the present disclosure contemplate a resilient distributed ledger that is implemented with blockchain technology and used to record payment transactions initiated onboard the aircraft 10 for subsequent reconciliation with a ground-based payment processor. Referring to the block diagram of FIG. 2, the foundational components of an offline payment processor system 64 include the aforementioned payment terminals 32. Although four payment terminals 32a-32d are depicted, this is by way of example only and not of limitation. Any number of fewer or additional payment terminals 32 may be onboard the aircraft 10.

Figure 3:
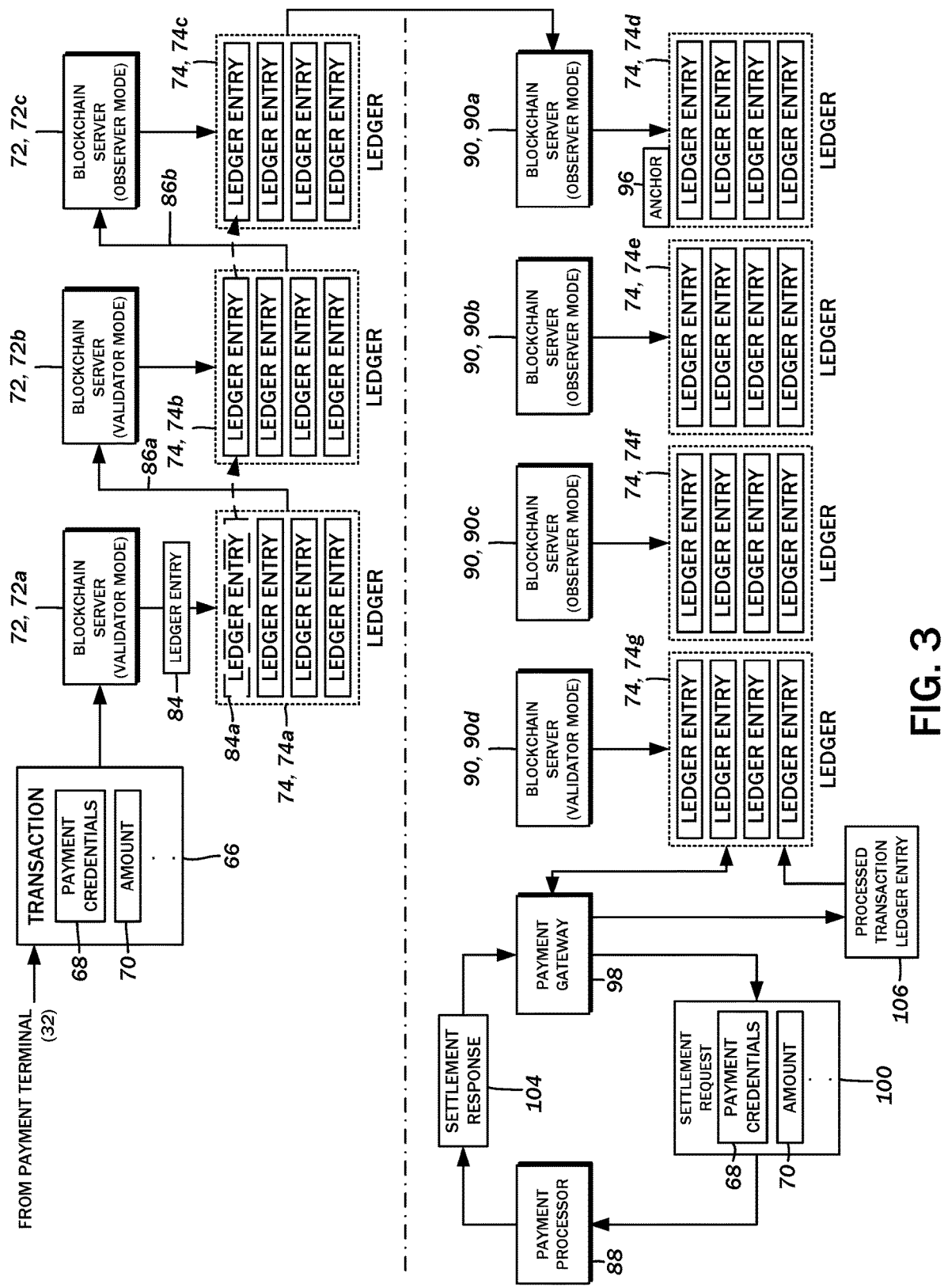
FIG. 3 is a diagram illustrating the sequence of data processing operations implemented by the offline payment processor.
Figure 4A:
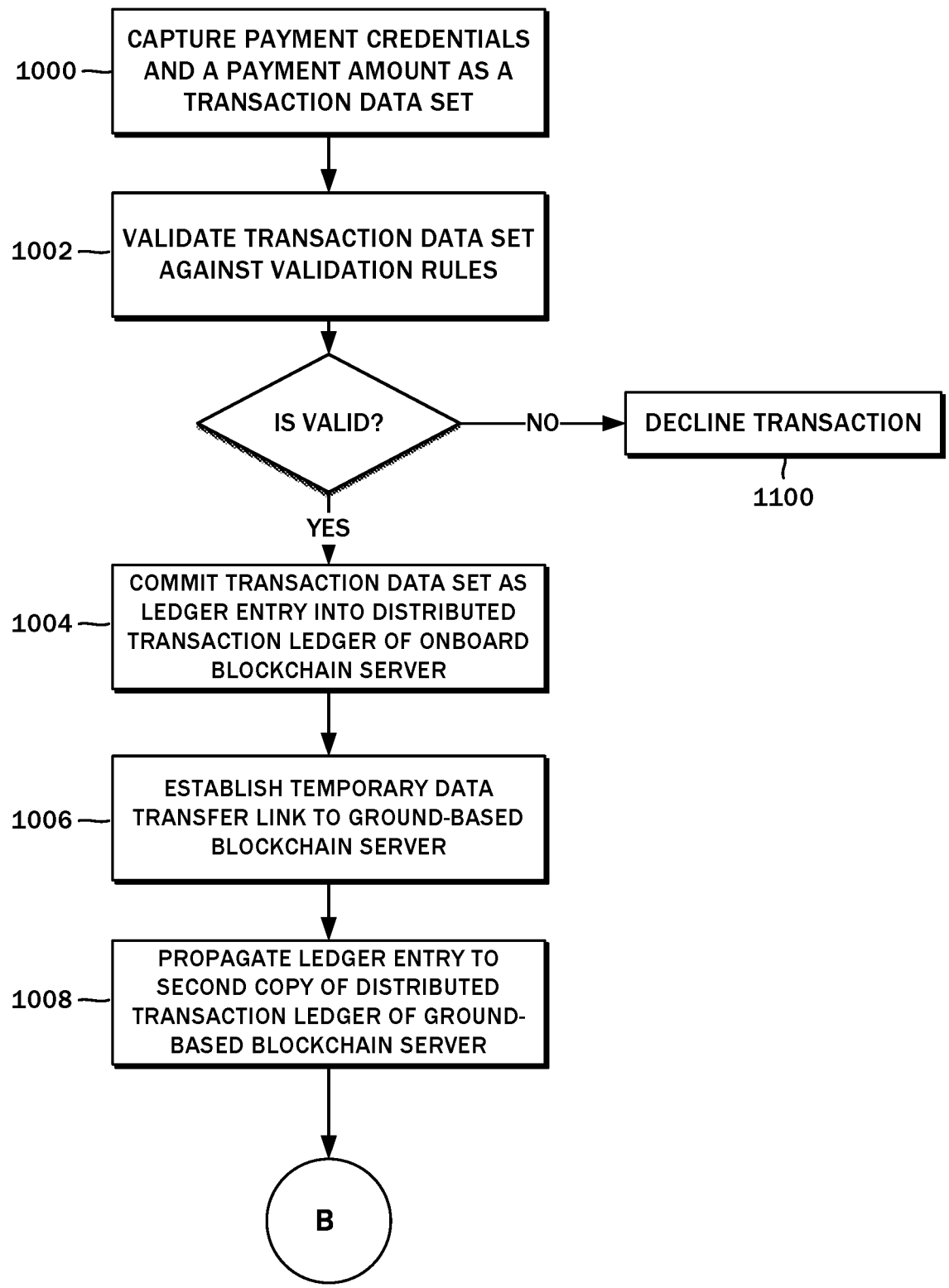
FIGS. 4A-4B are flowcharts illustrating an embodiment of a method for offline transaction processing.
Figure 4B:
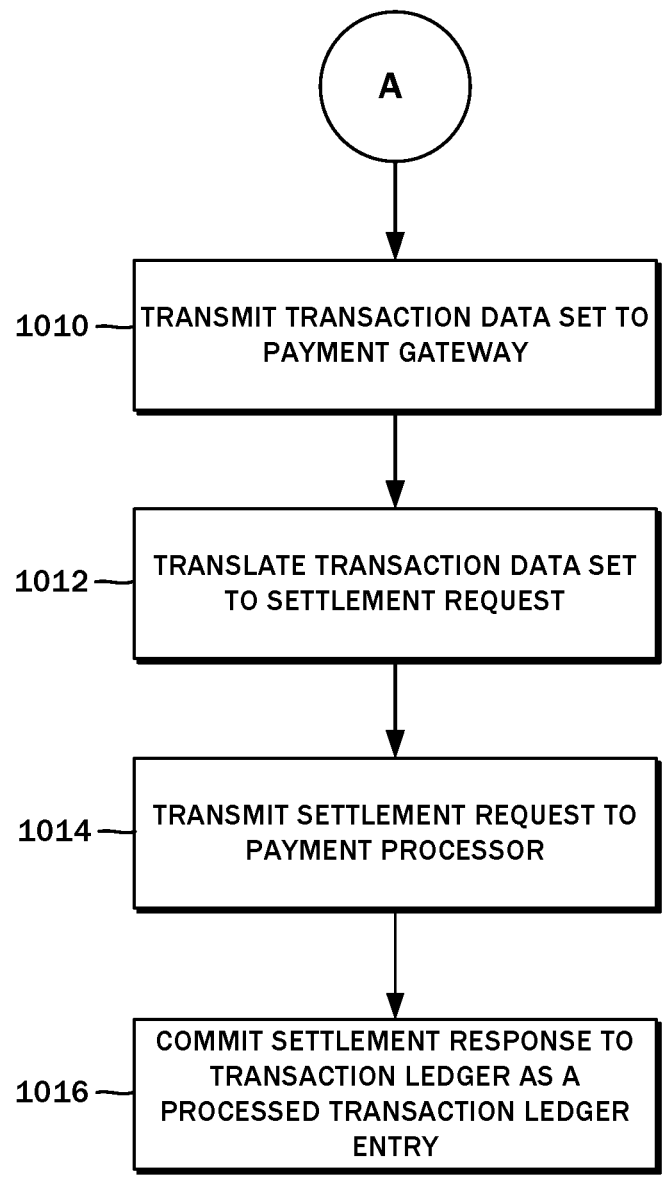

With additional reference to the block diagram of FIG. 3, the payment terminal 32 may capture a transaction data set 66 that includes payment credentials 68 and a payment amount 70. The present disclosure also contemplates a method for offline transaction processing, the steps of which are illustrated in FIGS. 4A-4B. In accordance therewith, the method begins with a step 1000 of so capturing at least the payment credentials 68 and the payment amount 70 as the transaction data set 66. The payment credentials 68 may be a credit card account number, a debit card account number, or any other identifying information for financial account from which payment can be sent, e.g., bank accounts, etc. The payment credentials 68 may also include additional data such as expiration date, accountholder name, and so on. The payment amount 70 is specified in terms of a fiat currency; the specific currency/country that is utilized by the offline payment processor system 64 may vary depending on the destination and/or origin country of the aircraft 10.

Figure 2:
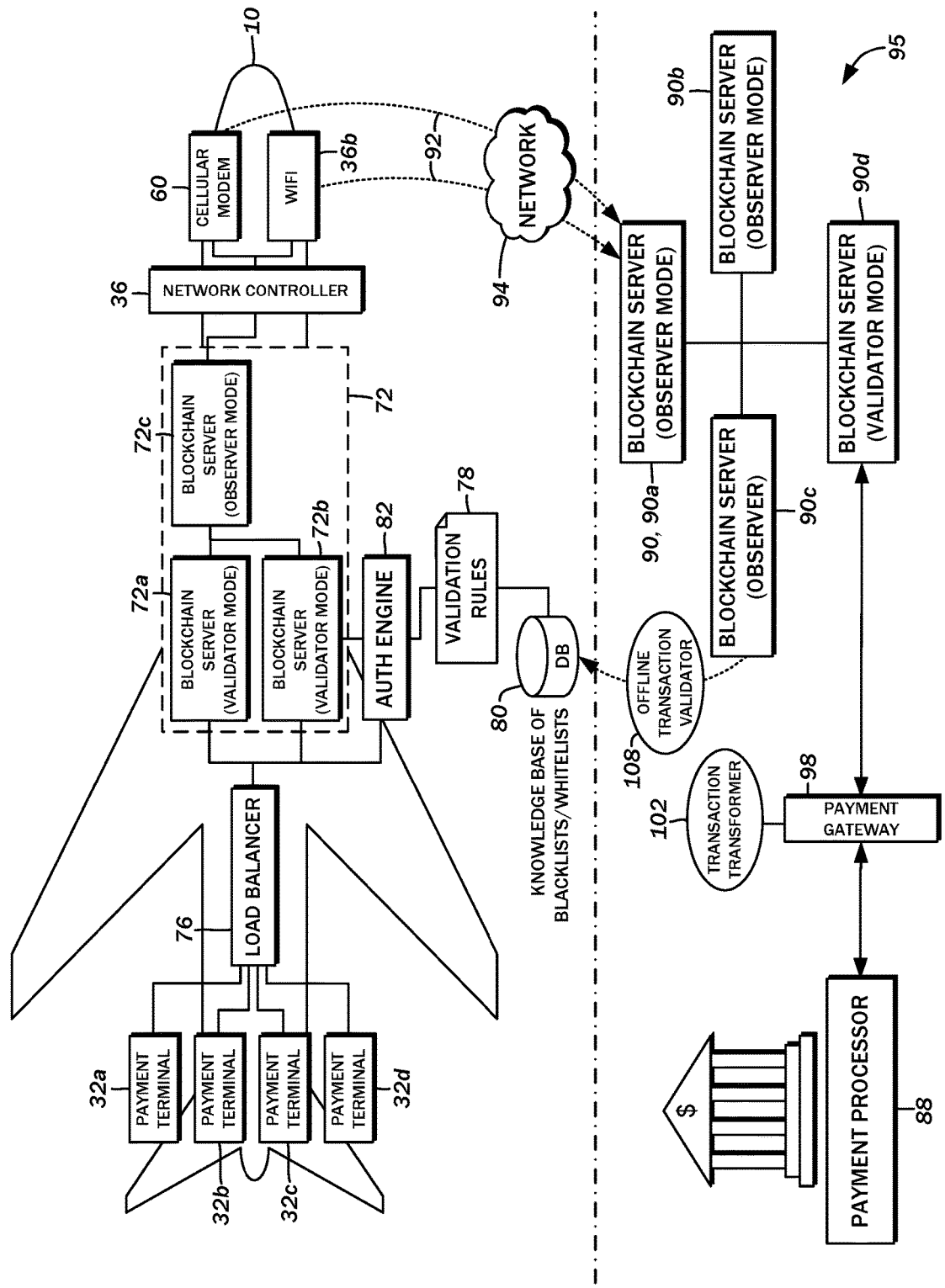
FIG. 2 is a diagram of the components of an offline payment processor system in accordance with one embodiment of the present disclosure.

As primarily shown in the block diagram of FIG. 2, the offline payment processor system 64 includes an onboard blockchain server 72. More particularly, there may be a first onboard blockchain server 72a, a second onboard blockchain server 72b, and a third onboard blockchain server 72c, the three being collectively referred to as the onboard blockchain server 72. FIG. 1 illustrates that the onboard blockchain server 72 is part of the IFEC server 22, or at least run on the same hardware components or LRU as the IFEC server 22. This is by way of example only and not of limitation, however, as the onboard blockchain server 72 may be in a separate LRU with its own processor, memory, data storage, and network interface.

In one implementation, the onboard blockchain server 72 utilizes the Openchain open source distributed ledger platform, though any other suitable distributed ledger technology may be substituted. This distributed ledger platform is contemplated for settling captures of the fiat currency transactions. The onboard blockchain server 72 may operate in either a validator mode or an observer mode, and in the illustrated example of FIG. 2, the first and second onboard blockchain servers 72a, 72b, are operating in the validator mode while the third onboard blockchain server 72c is operating in the observer mode. Regardless of operating mode, as best shown in FIG. 3, the onboard blockchain server 72 maintains its own copy of a distributed transaction ledger 74 that constitutes a record of transactions processed thereby.

Generally, the transaction data set 66 is received by the onboard blockchain server 72 from the payment terminals 32, that is, the onboard blockchain server 72 is in communication with the payment terminals 32 to accept the transaction data set 66 captured thereby. Preferably, though optionally, the payment terminals 32 are connected to a load balancer 76 that evenly distributes the data traffic from the payment terminals 32 to the upstream onboard blockchain servers 72.

The onboard blockchain server 72, particularly one that is operating in the validator mode, accepts and validates transactions for entry into the distributed transaction ledger 74. This validation may be based upon one or more transaction validation rules 78 that are stored in an offline rule database 80. These transaction validation rules 78 may be customizable by a system administrator, and are understood to be a combination of implicit rules as well as explicit permissions.

The offline payment processor system 64 uses the transaction validation rules to evaluate the captured transaction data set 66 to determine if it is valid or invalid without consulting a payment processor that can authoritatively decline or proceed with a payment transaction. The comparison/evaluation of the transaction data set 66 against the transaction validation rules 78 may be performed by a payment authorization engine 82 that may be part of the IFEC server 22 or other component on the local area network 34. Referring to the flowchart of FIG. 4A, the foregoing corresponds to a step 1002 of validating the transaction data set 66 against the one or more transaction validation rules 78 stored on the offline rule database 80.

In response to a successful validation, the onboard blockchain server 72 commits the captured transaction data set 66 to the distributed transaction ledger 74 as a ledger entry 84. This corresponds to a step 1004 of the method depicted in the flowchart of FIG. 4A. An unsuccessful validation at this point simply ends with declining the transaction in a step 1100. An indicator to this effect may be transmitted back to the originating payment terminal. Each of the separate onboard blockchain servers 72a-72c maintains its own copy of the distributed transaction ledger 74. As best shown in the example of FIG. 3, the first onboard blockchain server 72a has a first copy of a distributed transaction ledger 74a, the second onboard blockchain server 72b has a second copy of the distributed transaction ledger 74b, and the third onboard blockchain server 72c has a third copy of the distributed transaction ledger 74c. Direct commit operations to the distributed transaction ledger 74 are understood to be possible for blockchain servers that are operating in the validator mode.

These blockchain servers, after committing the ledger entry 84 into its respective distributed transaction ledger 74, e.g., the first onboard blockchain server 72a committing a new ledger entry 84a into the first copy of the distributed transaction ledger 74a, propagates the new entry to the other distributed transaction ledgers 74. One implementation of the onboard blockchain servers 72 utilizes the Secure HyperText Transfer Protocol (HTTPS) for the underlying data processing operations. In the example shown in FIG. 3, there may be a first ledger state update step 86a to the second onboard blockchain server 72b, which is followed by a second ledger state update step 86b to the third onboard blockchain server 72c from the second copy of the distributed transaction ledger 74b. This serial propagation of changes to each copy of the distributed transaction ledger 74 is presented as an example of one possible implementation. It is also possible for both of the other copies of the distributed transaction ledger 74b, 74c to be updated simultaneously or substantially contemporaneously, that is, both at once without requiring one step be completed before the other step commences.

Implementations of some embodiments of the onboard blockchain server 72 may utilize the Openchain platform, as described above. The underlying database system for storing the data for the distributed transaction ledger 74 and other components may be SQLite, which may be adapted to a wide variety of computer systems, including small Internet of Things (IoT) devices as well as conventional server computers along the lines of the aircraft installation described herein.

The network connections between and among the onboard blockchain server 72 remain established during its operational cycle, so the foregoing view synchronization of the distributed transaction ledgers 74a-74c can be continuous, that is, without non-anomalous interruptions. The embodiments of the offline payment processor system 64 further contemplates the settlement of the transactions initiated onboard the aircraft 10 while being offline, e.g., not in continuous communication with a payment processor 88 that can authoritatively decline or authorize a payment transaction. One aspect may involve the synchronization of the distributed transaction ledger 74 as maintained by the onboard blockchain servers 72 with those maintained by a cluster of ground-based blockchain servers 90. The resilient distributed ledger implementation is contemplated to allow for such synchronization over temporary data transfer links that are established only under certain circumstances such as when the aircraft 10 lands between flights, when a satellite uplink becomes available while in flight, and so on.

When a data transfer link to the ground-based blockchain servers 90 is either detected automatically as being available, e.g., weight-on-wheels sensor has been activated so the aircraft 10 is known to be on the ground, or when such data transfer link is known to be available, e.g., or when the aircraft operator is on the ground and subsequently activates a switch that begins the process of initiating the data transfer link, the method proceeds to a step 1006 of establishing a temporary data transfer link 92 from the onboard blockchain server 72 to the ground-based blockchain server 90. Specifically, the network controller/data communications module 36 that is part of the IFEC system 18 may initiate the link 92, using either the cellular modem 60 or the local wireless network interface 36b may be used to connect to wider network 94 to which the ground-based blockchain server 90 may also be connected. Again, because the temporary data transfer link 92 is established only for a limited time, the communications between the onboard blockchain server 72 and the ground-based blockchain server 90 is understood to be sporadic.

The ground-based blockchain servers 90 define a cluster 95, though some, such as the first ground-based blockchain server 90a, the second ground-based blockchain server 90b, and the third ground-based blockchain server 90c are operating in the observer mode, while another, e.g., the fourth ground-based blockchain server 90d, is operating in the validator mode. An observer node is understood to connect to an upstream validator node, which may be either the first or second onboard blockchain server 72a, 72b, or the fourth ground-based blockchain server 90d, as will be described in further detail below. A blockchain server operating in the observer mode is understood to be restricted from submitting a new transaction, as it has a read-only view of the distributed transaction ledger 74.

As discussed above, the onboard blockchain server 72 commits changes to the distributed transaction ledger 74 when a new payment transaction is made, and these ledger entries are propagated to the ground-based blockchain servers 90 over the aforementioned temporary data transfer link 92, which in the context of the method for offline transaction processing, correspond to a step 1008. Thus, like the onboard blockchain servers 72, the ground-based blockchain servers 90 each also maintain its respective copy of the distributed transaction ledger 74. The first ground-based blockchain server 90a has a fourth copy of the distributed transaction ledger 74d, the second ground-based blockchain server 90b has a fifth copy of the distributed transaction ledger 74e, the third ground-based blockchain server 90c has a sixth copy of the distributed transaction ledger 74f, and the fourth ground-based blockchain server 90d has a seventh copy of the distributed transaction ledger 74g. In the method illustrated in the flowchart of FIG. 4A, there is a step 1200 of propagating the ledger entry 84 to the fourth copy of the distributed transaction ledger 74b that is being maintained by the first ground-based blockchain server 90a. Afterwards, all of the views or copies of the distributed transaction ledger 74a-74g, whether onboard the aircraft 10 or on the ground, are understood to be identical to each other.

The integrity of the distributed transaction ledger 74 across the entire cluster of blockchain servers may be maintained with the use of anchors 96 that may contain cumulative hash values of the distributed transaction ledger 74. The anchor 96 generated for one copy of the distributed transaction ledger 74 may be used by another blockchain server to verify its copy by generating its own cumulative hash value thereof and comparing against the anchor 96. For example, the second ground-based blockchain server 90b may generate a cumulative hash value of its fifth copy of the distributed transaction ledger 74e to compare against the cumulative hash value in the anchor 96 pertaining to the fourth copy of the distributed transaction ledger 74d. This feature is understood to enable tamper detection, missing transactions detection, and eliminate duplication.

Based upon the ledger entries 84 corresponding to the new transaction data sets 66 committed to the distributed transaction ledger 74, it is possible to submit the payments to the payment processor 88 for reconciliation. Various embodiments of the present disclosure thus include a payment gateway 98 that is in communication with the cluster 95 of ground-based blockchain servers 90, including the aforementioned first ground-based blockchain server 90a to which the ledger entry 84 was propagated from the onboard blockchain servers 72. The payment gateway 98 is understood to retrieve the ledger entries 84, and transform the same into the constituent data elements of the payment credentials 68 and the payment amount 70. This data, in turn, may be packaged into a settlement request 100 in a format that is expected by the payment processor 88.

In the context of the method for offline transaction processing as further detailed in FIG. 4B, this may correspond to a step 1010 of transmitting the transaction data set 66 corresponding to the propagated ledger entry 84 to a payment gateway 98, with an associated step 1012 of translating the transaction data set 66 to the settlement request 100. Additional data elements requested by the payment processor 88 may also be provided. The conversion/transformation may be performed by a transaction transformer 102 that has access to the distributed transaction ledger 74, and may be either a modular component of the payment gateway 98 or a standalone system that interacts with the payment gateway 98. The payment gateway 98 then transmits the settlement request to the payment processor 88 in a step 1014.

As mentioned briefly above, the payment processor 88 has access to the funds or credit in a financial account of the customer/cardholder via various card networks, and the ability to transfer funds to the financial account of the merchant (which in the context of the disclosed embodiment, is the airline selling the content or other in-flight amenities). It is understood that the card networks as well as the issuing bank of the financial account conduct its own verification procedures on the transactions that are submitted for processing, including the availability of funds to be deducted from the account. After verification, the submitted transaction or settlement request 100 may be authorized to proceed, thereby transferring the funds from the issuing bank and its account to the merchant bank account. When the transaction is authorized, the payment processor 88 may generate a settlement response 104 back to the payment gateway 98. In the method for offline payment processing, this may correspond to a step 1016 of receiving the settlement response 104 from the payment processor 88.

Upon receiving the settlement response 104, whether or not the submitted settlement request was reconcilable, the payment gateway 98 generates a corresponding processed transaction ledger entry 106 that is committed to the distributed transaction ledger 74. If the transaction was reconciled, there may be an additional data element indicating the same. Along these lines, if the transaction was not reconciled, e.g., the payment was refused, there may also be a different additional data element indicating that that the settlement request 100 was not reconcilable. More particularly, this ledger entry is committed to the seventh copy 74g of the fourth ground-based blockchain server 90d that is operating in the validator mode. This may correspond to a step 1016 in the method for offline transaction processing shown in the flowchart of FIG. 4B. In the same way as the incoming synchronization updates from the onboard blockchain servers 72, such updates to the distributed transaction ledger 74 are propagated to the other ground-based blockchain servers 90.

In accordance with various embodiments of the present disclosure, the synchronization between the distributed transaction ledgers 74 of the onboard blockchain servers 72 and those on the ground-based blockchain servers 90 may take place once at the end of the flight. The subsequent updates in the form of the processed transaction ledger entry 106 may not be propagated back to the onboard blockchain servers 72.

The processed transaction ledger entries from the payment gateway 98 may be used to enhance the capabilities of the payment authorization engine 82 by improving the offline rule database 80. It is envisioned that the offline payment processor system 64 include an offline transaction validator 108 that updates the transaction validation rules 78 based upon an aggregation of the settlement responses 104. The offline transaction validator 108 has access to the ground-based blockchain server 90, for example, the third one 90c that is operating in the observer mode. The offline transaction validator 108 may process each of the processed transaction ledger entries 106 in the distributed transaction ledger 74.

At a basic level, this may involve correlating the incoming ledger entries 84 from the onboard blockchain servers 72 with the corresponding processed transaction ledger entries 106 and evaluating whether those transactions were successfully reconciled or now. From multiple processed transaction ledger entries 106 for a given payer/customer that have been committed to the distributed transaction ledger 74, a customer payment profile may be built. More sophisticated analyses may be performed on this data using artificial intelligence/machine learning techniques to infer, transform, and build a knowledge base for blacklists and whitelists of customer profiles. A score value may be assigned to the customer payment profiles, and together with customized rules as defined in the transaction validation rules 78 may allow for greater discernment by the payment authorization engine 82 to allow or disallow a payment without the formal submission of the settlement request 100. This is contemplated to reduce fraudulent and invalid transactions while offline payment processor system 64 is disconnected from the payment processor 88.

The customer payment profiles and the adjusted rules settings for processing by the payment authorization engine 82 may be stored on the database system that is ground-based, and subsequently replicated to the offline rule database 80 on the aircraft 10. The copy of the offline rule database 80 may be transmitted to an entire fleet of aircraft 10 that may be under the management of one airline/carrier.

The particulars shown herein are by way of example only for purposes of illustrative discussion and are presented in the cause of providing what is believed to be the most useful and readily understood description of the principles and conceptual aspects of the various embodiments of in-flight fiat payment authorization and capture settlement using blockchain in an offline mode as set forth in the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. A system for offline transaction processing of a fiat currency in an aircraft, comprising:
   a payment terminal capturing payment credentials and a fiat currency payment amount associated therewith as a transaction data set;
   an offline rule database including one or more transaction validation rules for processing the fiat currency;
   a first onboard blockchain server with a first copy of a transaction ledger and being in communication with the payment terminal to accept the transaction data set, the first onboard blockchain server operating in a validator mode with the transaction data set being committed to the first copy of the transaction ledger as a ledger entry in response to a validation of the transaction data set against the one or more transaction validation rules;
   a second onboard blockchain server, operating in an observer mode, to receive the transaction data set from the first onboard blockchain server and relay the transaction data set to a ground-based blockchain server operating in the validator mode;
   a payment gateway in communication with the ground-based blockchain server and a remote payment processor, the payment gateway retrieving the transaction data set in a copy of the transaction ledger on the ground-based blockchain server for translation to an authorization, capture, or settlement request for the fiat currency transmitted to the remote payment processor and receiving an authorization, capture, or settlement response for the fiat currency from the remote payment processor, wherein the second onboard blockchain server operating in the observer mode is restricted from submitting a new transaction data set as a ledger entry in a transaction ledger, wherein the first onboard blockchain server operating in the validator mode is configured to accept and validate a new transaction data set for entry into a transaction ledger, and wherein the fiat currency is based on an origin country or a destination country of the aircraft.

2. The system of claim 1, wherein the authorization, capture, or settlement response is committed to the first onboard blockchain server that is further configured to communicate with the offline rule database to validate the transaction data set as a processed transaction ledger entry.

3. The system of claim 2, further comprising an offline transaction validator that updates the one or more transaction validation rules based upon the authorization, capture, or settlement response.

4. The system of claim 3, wherein the offline transaction validator builds a customer payment profile from one or more processed transaction ledger entries that include the processed transaction ledger entry.

5. The system of claim 4, wherein the offline transaction validator assigns a score to the customer payment profile based upon an aggregate of the one or more processed transaction ledger entries, the score being associated with the one or more transaction validation rules.

6. The system of claim 5, wherein a customer whitelist is generated from one or more customer payment profiles with positive scores assigned thereto.

7. The system of claim 5, wherein a customer blacklist is generated from one or more customer payment profiles with negative scores assigned thereto.

8. The system of claim 2, wherein the processed transaction ledger entry is identified, by the remote payment processor, as either reconciled or unreconciled.

9. The system of claim 1, wherein the first onboard blockchain server uses a cumulative hashing technique to verify a ledger entry corresponding to the transaction data set made by a third onboard blockchain server operating in the validator mode.

10. The system of claim 1, further comprising:
M onboard blockchain servers, operating in the validator mode, that include the first onboard blockchain server, wherein M is a positive integer; and
N ground-based blockchain servers, operating in the validator mode, that include the ground-based blockchain server, wherein N is a positive integer,
wherein M is even and N=M−1.

11. The system of claim 1, further comprising:
M onboard blockchain servers, operating in the observer mode, that include the second onboard blockchain server, wherein M is a positive integer; and
N ground-based blockchain servers, operating in the observer mode, that include the ground-based blockchain server, wherein N is a positive integer,
wherein both M and N are odd.

* * * * *